F. R. WEATHERSBY.
DRILL.
APPLICATION FILED MAY 10, 1913.
1,102,112.
Patented June 30, 1914.
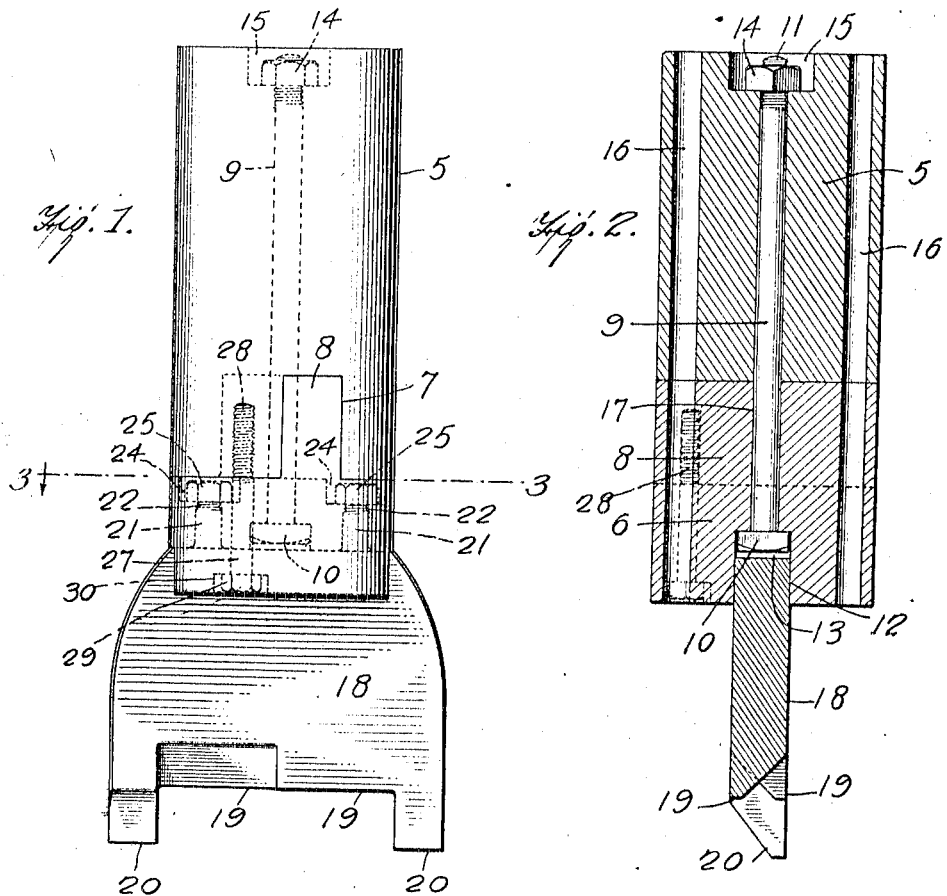
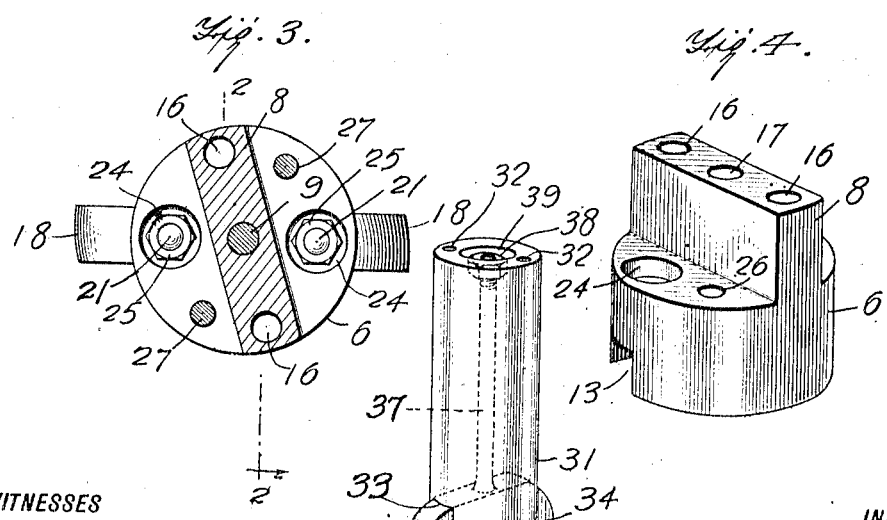
WITNESSES
INVENTOR
FRED R. WEATHERSBY,
BY Munn & Co.
ATTORNEYS

UNITED STATES PATENT OFFICE.

FRED RICHARD WEATHERSBY, OF HOUSTON, TEXAS.

DRILL.

1,102,112.  Specification of Letters Patent.  Patented June 30, 1914.

Application filed May 10, 1913. Serial No. 766,827.

*To all whom it may concern:*

Be it known that I, FRED R. WEATHERSBY, a citizen of the United States, and a resident of Houston, in the county of Harris and State of Texas, have made certain new and useful Improvements in Drills, of which the following is a specification.

My invention relates to drills of the general type disclosed in my pending application Number 744,139, filed January 25, 1913, and patented November 4, 1913, No. 1,077,772 my more particular purpose being to provide an improved form of shank, together with an improved form of disk detachably connected therewith, and means for connecting a disk or cutter with the disk.

My invention further contemplates improved mechanism for holding the disk upon the shank and for preventing undesirable movements of the cutter relatively to the disk.

My improved drill is specially adapted for earth boring, but may be employed in various other relations.

Reference is made to the acompanying drawing forming a part of this specification, and in which like letters indicate like parts.

Figure 1 is an elevation showing my improved drill, consisting of the shank, the disk and the cutter, these parts being connected, ready for practical use. Fig. 2 is a section on the line 2—2 of Fig. 3, looking in the direction of the arrow. Fig. 3 is a section on the line 3—3 of Fig. 1, looking in the direction of the arrow, and showing the proximate lower half of the drill. Fig. 4 is a detail showing in perspective the disk for holding the cutter. Fig. 5 is a perspective of a different form of my drill.

The shank is shown at 5 and the disk at 6. The shank is provided with a slot 7 and the disk is provided with a tongue 8 adapted to fit neatly into said slot. A bolt 9 provided with a head 10 and with a threaded portion 11 extends in the general direction of the axes of the disk 6 and the shank 5, as indicated in Fig. 2, and is used for holding the disk upon the shank. The disk is provided with a slot 12 and with a recess 13 into which the slot merges, the recess serving as a sink for the head 10. A nut 14 is revolubly mounted upon the threaded portion 11, and occupies a recess 15 at the upper end of the shank. The disk and the shank, considered as a unit, are provided with water holes 16 extending entirely through them in the general direction of their common length. For the purpose of accommodating the bolt 9, the disk 6 is provided with a hole 17 which continues through the tongue 8, as will be understood from Fig. 4.

A cutter is shown at 18 and is provided with chamfered edges 19, and also with pilot blades 20 integral with the cutter. These pilot blades extend downwardly beyond the chamfered edges 19 and are adapted to bite into a rock or other hard substance so as to cut a groove therein and thus steady the drill by diminishing its liability to be pushed laterally out of its general vertical path of travel while in action. The cutter 18 has a maximum width greater than the thickness of the shank 5, and also greater than the diametrical thickness of the disk 6, which is the same as the diametrical thickness of the shank. The cutter 18 carries two stems 21 preferably integral with it. These stems, at their outer ends, are provided with threads 22, and are adapted to extend through holes 23 with which the disk 6 is provided. The disk is further provided with two recesses 24 into which the holes 23 merge. Housed within the recesses 24 are nuts 25 which are fitted upon the threaded portions 22 of the stems 21, and are thus countersunken within the disk.

The disk 6 is provided with two holes 26, one of which is shown in Fig. 4, and extending through these holes are bolts 27 which are provided with threaded portions 28, and with heads 29. These heads are located in recesses 30 with which the disk 6 is provided, and are thus housed within the disk. The threaded portions 28 of the bolts 27 extend into the stem 5 and are located upon opposite sides of the tongue 8.

The drill above described possesses a number of advantages. As the disk is detachably connected with the shank 5, it may, when worn out, be replaced by another. The tongue 8 being of massive construction and neatly fitted into the slot 7, which is of considerable size, affords a good gripping anchorage as between the disk and the stem. Again, the bolt 9, which I conveniently designate as the main fastening bolt, effectively holds the disk upon the stem, and the smaller bolts 27, which I term auxiliary fastening bolts still further secure the disk relatively to the stem. With this drill, if through accident the tongue 8 should become broken, the fastening bolts 27 tend to hold the parts in position, and even if these bolts be broken or twisted off the main fastening bolt 9, continues to hold the parts. By virtue of the axial location of the main fastening bolt 9, and of the effective protection afforded to the head 10 and the nut 14 by sinking these members, the bolt 9 tends to prevent the complete severance of the disk from the shank, even if the drill be disabled so badly as to become useless. The arrangement of the various parts is such that while the drill is in action, water may be fed through the water holes 16.

The cutter 18, having a maximum width greater than the diameter of the disk or that of the shank, prevents the shank or disk from binding or becoming clogged while in action. In the form shown in Fig. 5 I do not employ a disk. The shank appears at 31 and is provided with water holes 32 and with a slot 33. A cutter is shown at 34 and is provided with cutting edges 35 and with pilot blades 36. The cutter is further provided with a stem 37 which extends through a hole in the shank and is secured by a nut 38, the latter being housed in a sink 39.

I do not limit myself to the precise mechanism shown as variations may be made therein without departing from the spirit of my invention, the scope of which is commensurate with my claims.

I claim:—

1. In a drill, the combination of a shank provided with a slot at one end and with a hole extending axially therethrough and merging at one end into the slot, the opposite end of the shank being provided with a sink surrounding the adjacent end of the hole, said shank being also provided with water holes extending longitudinally throughout its entire length and disposed parallel with one another upon diametrically opposite sides of its hole, a cutter fitted into the slot at one end of the shank and provided with an integral stem extending through the said hole, and a nut threaded upon the opposite end of the stem and disposed within the sink at the adjacent end of the shank, all for the purpose described.

2. In a drill the combination of a shank provided with a hole extending axially therethrough from end to end to receive a connecting member and with water holes also extending therethrough from end to end and located parallel with one another and upon diametrically opposite sides of the axial hole, said shank being slotted at one end, a cutter mounted adjacent the slotted end of the shank, and a connecting member extending through the axial hole of the shank to assist in maintaining the cutter in position.

FRED RICHARD WEATHERSBY.

Witnesses:
J. D. LONG,
J. ALBERT MILLER.